United States Patent
Steinberg et al.

(10) Patent No.: US 7,814,802 B2
(45) Date of Patent: Oct. 19, 2010

(54) METHOD OF PRODUCING A CONNECTION BETWEEN A MEASURING TUBE AND AT LEAST ONE FLANGE

(75) Inventors: Reinhard Steinberg, Worbis (DE); Lothar Deppe, Göttingen (DE); Wolfgang Waldi, Nussloch-Maisbach (DE); Frank Kassubek, Baden (DE); Steffen Keller, Karlsruhe (DE); Jörg Gebhardt, Mainz (DE); René Friedrichs, Rosdorf (DE); Robert Huber, Ketsch (DE)

(73) Assignee: ABB Patent GmbH, Ladenburg (DE)

( * ) Notice: Subject to any disclaimer, the term of this patent is extended or adjusted under 35 U.S.C. 154(b) by 215 days.

(21) Appl. No.: 11/882,416

(22) Filed: Aug. 1, 2007

(65) Prior Publication Data
US 2008/0028589 A1 Feb. 7, 2008

(30) Foreign Application Priority Data
Aug. 5, 2006 (DE) ............ 10 2006 036 747

(51) Int. Cl.
*G01F 1/84* (2006.01)
*B23P 11/02* (2006.01)
*F16L 59/16* (2006.01)

(52) U.S. Cl. .......... 73/861.354; 29/447; 29/523; 285/55

(58) Field of Classification Search .......... 29/512, 29/509; 73/861.354–861.357, 866.5
See application file for complete search history.

(56) References Cited

U.S. PATENT DOCUMENTS

| | | | | |
|---|---|---|---|---|
| 1,804,814 A * | 5/1931 | Schultis | ........... | 285/334.5 |
| 2,168,038 A * | 8/1939 | Moore | ........... | 346/123 |
| 2,613,958 A * | 10/1952 | Richardson | ........... | 285/55 |
| 2,724,969 A * | 11/1955 | Bloser | ........... | 73/861.76 |
| 2,857,666 A * | 10/1958 | Beyer | ........... | 29/523 |
| 3,142,868 A * | 8/1964 | Blount | ........... | 425/11 |
| 3,383,750 A * | 5/1968 | West et al. | ........... | 29/890.15 |
| 4,118,855 A * | 10/1978 | Lequeux | ........... | 29/447 |
| 4,365,404 A * | 12/1982 | Castro et al. | ........... | 29/455.1 |
| 4,643,457 A * | 2/1987 | Press | ........... | 285/55 |
| 5,056,210 A * | 10/1991 | King, Jr. | ........... | 29/523 |
| 5,192,095 A * | 3/1993 | Behrens | ........... | 285/332.1 |
| 5,415,443 A * | 5/1995 | Hayashi | ........... | 285/405 |
| 6,260,401 B1 * | 7/2001 | Tada | ........... | 72/370.06 |
| 7,464,453 B2 * | 12/2008 | Meinig | ........... | 29/505 |
| 2003/0084559 A1 | 5/2003 | Cook et al. | | |
| 2005/0005987 A1 * | 1/2005 | Hayes et al. | ........... | 138/118 |

\* cited by examiner

*Primary Examiner*—Harshad Patel
(74) *Attorney, Agent, or Firm*—Buchanan Ingersoll & Rooney PC

(57) ABSTRACT

A method is disclosed for producing a connection between a measuring tube and at least one flange, e.g., in the case of a Coriolis mass flowmeter. In order to ensure reliable connection of the components in this case, the measuring tube can be inserted at one end over a portion through a flange bore, such that it projects out of the bore on the other side, and that the projecting end be flared out over the sealing face of the flange.

10 Claims, 1 Drawing Sheet

METHOD OF PRODUCING A CONNECTION BETWEEN A MEASURING TUBE AND AT LEAST ONE FLANGE

RELATED APPLICATIONS

This application claims priority under 35 U.S.C. §119 to German Application 10 2006 036 747.2 filed in Germany on Aug. 5, 2006, the entire contents of which are hereby incorporated by reference in their entireties.

TECHNICAL FIELD

The disclosure relates to a method of producing a connection between a measuring tube and at least one flange, e.g., in the case of a Coriolis mass flowmeter.

BACKGROUND INFORMATION

Flowmeters which make use of the widest possible range of flow-dependent measuring effects are known and widely used. They differ in structural shape, which is dependent on the measuring effect on which they are based. Often, so-called Coriolis meters are used, in which the measuring medium is passed through a bent measuring tube, which causes deflection as a function of the flow, which is then measured, the flow being calculated therefrom and indicated.

This structural shape also entails that deflection of the measuring tube remain limited to the selected measuring path. Since vibrations are generated by the deflection, this vibration needs to remain vibrationally or mechanically isolated to the length of the measuring path without dissipating energy outwards.

However, these connections between the measuring tube and the housing are also subject to the effects of changing temperatures. The measuring tube has always to remain firmly clamped in place, since deflection is ultimately the variable which is of relevance to flow. Therefore all other forms of mechanical mobility have to be eliminated, so as not to distort the measuring effect. This includes avoiding mechanical play development due to thermal factors.

A connection of this type is known from US 2003/0084559A1, in which a shrink-mounting method is selected, i.e. the materials are dimensioned relative to one another so as to produce a shrink-fit, i.e. the material is thermally expanded and then shrunk onto the corresponding component by cooling.

If welded or brazed connections are to be put to only certain uses, special requirements have to be made of any form of shrunk or clamped connection.

One problem is that clamped or shrunk connections must not loosen in particular under the effects of temperature changes. Apart from the fact that the entire static design would thereby be called into question, the mechanical play arising would be added to the tube deflection caused by the measuring effect and would thus distort the measured value to an enormous degree.

SUMMARY

An object of the invention is therefore to avoid this problem in the case of a production method and of a Coriolis mass flowmeter itself and to ensure a permanently strong connection between measuring tube and flange.

The measuring tube can be inserted at one end over a portion through a flange bore, such that it projects out of the bore on the other side, and that the projecting end is flared out over the sealing face of the flange.

The measuring tube is then fixed not only in an axial reference position but also at the same time in a radial reference position. The extreme axial reference position stability is produced in that the flared-over area rests on the sealing face of the flange, such that this area subsequently lies in axially fixed manner between flanges.

The enormous radial fixing is produced in that the flared-round area optionally measures a multiple of the diameter of the measuring tube. Clamped between the flanges, an enormous fitting position which is radial or secured in its rotational position arises over the diameter.

In an advantageous development of the method, during flaring, an expansion tool is firstly introduced into the projecting tube portion, and then the latter is expanded in such a way that it is flared over around the edges of the sealing face. Stepwise expansion prevents undesired tearing of the material.

In a further advantageous development, said tube portion is therefore heat-treated for the expansion and flaring process. This makes the material locally more readily deformable at this point.

The heat treatment may also be effected beforehand, by said tube portion being pre-heat-treating in such a way that it is soft-annealed. Expansion and flaring are then easier.

In an advantageous variant, the tube portion to be expanded optionally consists of a different material from the measuring tube itself, and is welded thereto and, after being pushed through the flange, is expanded and flared as described above.

A further alternative consists in the tube portion being firstly inserted through an annular disk, which in turn is welded or brazed firmly to the tube, and being then subsequently pressed into an at most exactly fitting receiving opening in the flange, and then said tube portion being flared round altogether.

In addition, a Coriolis flowmeter can be provided having at least one measuring tube which is attached to a flange and is produced by the method steps, the measuring tube plus flange being fastenable in a housing or a supporting frame.

BRIEF DESCRIPTION OF THE DRAWINGS

The invention is illustrated in the drawings and described in greater detail below.

In the Figures.

DETAILED DESCRIPTION

Figure 1:
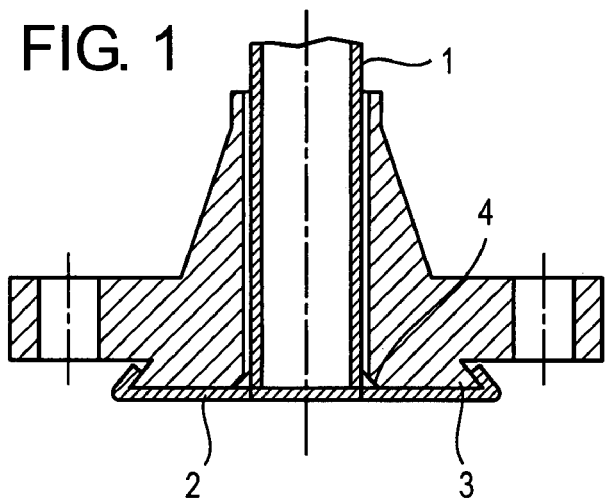
FIG. 1: shows a development with flared-open measuring tube end

FIG. 1 shows a first development with a measuring tube 1, which is pushed through the bore in a flange 4. The projecting end 2 of the measuring tube 1 is then expanded with a conical tool and flared over the entire sealing face of the flange 4 as far as round the sealing face edge 3. Thus, when the flange 4 has been applied against a further flange, this flared-round area lies firmly therebetween and provides both axial position securing and radial antitwist protection.

Figure 2:
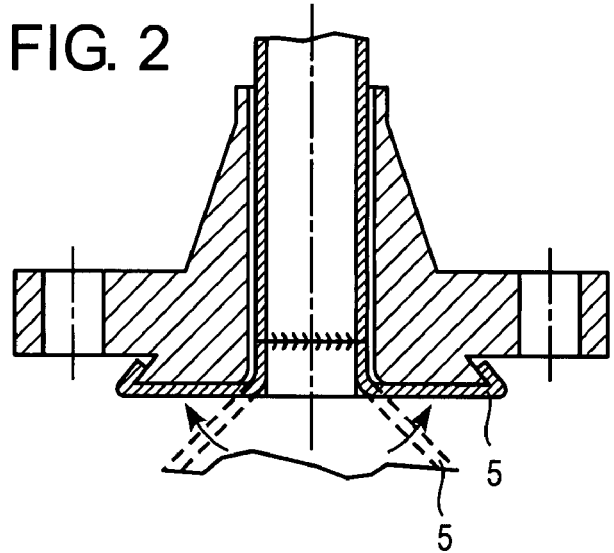
FIG. 2: shows a development with welded-on, flared-open tube portion

FIG. 2 shows a further embodiment which ultimately is otherwise as shown in FIG. 1. However, the pushed-through measuring tube portion is optionally, but not imperatively, made from a different material. In any case, it is welded to the measuring tube 1. The tube portion 5 extending through is then flared round in the same way as described with regard to FIG. 1.

Figure 3:
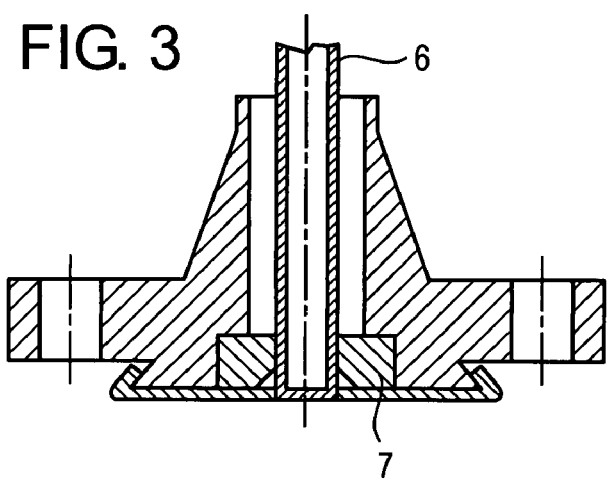
FIG. 3: shows a development with flaring and pressed-in, welded-on ring.

FIG. 3 shows an embodiment in which the measuring tube 6 is firstly welded to an annular disk 7, which is then pressed into an exactly fitting, i.e. optionally even into an undersized and thus into a corresponding opening in the flange.

The projecting tube portion is then flared round in the same way, flaring taking place both over the surface of the annular disk 7 and over the sealing face of the flange, as described above.

Through the additional use of a suitably sized annular disk 7 welded to the measuring tube, good prepositioning of the elements is achieved, in order to achieve direct flaring round close to the final position and final dimensions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of producing a connection between a measuring tube and at least one flange with at least one sealing face on one side, comprising: inserting the measuring tube at one end over a portion through a flange bore, such that it projects out of the bore on the other side, and flaring the projecting end out over the sealing face of the flange, wherein the tube portion is firstly inserted through an annular disk, which in turn is welded or brazed firmly to the tube, and is then subsequently pressed into an at most exactly fitting receiving opening in the flange, and then said tube portion is flared round altogether.

2. The method as claimed in claim 1, wherein, during flaring, an expansion tool is firstly introduced into the projecting tube portion, and then the latter is expanded in such a way that it is flared over around the edges of the sealing face.

3. The method as claimed in claim 2, wherein said tube portion is heat-treated for the expansion and flaring process.

4. The method as claimed in claim 1, wherein said tube portion is heat-treated for the expansion and flaring process.

5. The method as claimed in claim 4, wherein said tube portion is pre-heat-treated in such a way that it is soft-annealed.

6. The method as claimed in claim 5, wherein the tube portion to be expanded optionally consists of a different material from the measuring tube itself, and is welded thereto and, after being pushed through the flange, is expanded and flared as described above.

7. The method as claimed in claim 1, wherein the tube portion to be expanded optionally consists of a different material from the measuring tube itself, and is welded thereto and, after being pushed through the flange, is expanded and flared as described above.

8. The method as claimed in claim 7, wherein the tube portion is firstly inserted through an annular disk, which in turn is welded or brazed firmly to the tube, and is then subsequently pressed into an at most exactly fitting receiving opening in the flange, and then said tube portion is flared round altogether.

9. A Coriolis flowmeter having at least one measuring tube which is attached to a flange and is produced by a method comprising: inserting the measuring tube at one end over a portion through a flange bore, such that it projects out of the bore on the other side, and flaring the projecting end out over the sealing face of the flange, wherein the tube portion is firstly inserted through an annular disk, which in turn is welded or brazed firmly to the tube, and is then subsequently pressed into an at most exactly fitting receiving opening in the flange, and then said tube portion is flared round altogether, the measuring tube plus flange being fastenable in a housing or a supporting frame.

10. A method of producing a connection between a measuring tube and at least one flange with at least one sealing face on one side, in the case of a Coriolis mass flowmeter, comprising: inserting the measuring tube at one end over a portion through a flange bore, such that it projects out of the bore on the other side, and flaring the projecting end out, wherein the tube portion is firstly inserted through an annular disk, which in turn is welded or brazed firmly to the tube, and is then subsequently pressed into an at most exactly fitting receiving opening in the flange, and then said tube portion is flared round altogether.

* * * * *